US012309220B2

(12) United States Patent
Roseborough et al.

(10) Patent No.: US 12,309,220 B2
(45) Date of Patent: May 20, 2025

(54) LOCATION BASED ACCESS CONTROL FOR CONTENT DELIVERY NETWORK RESOURCES

(71) Applicant: Adeia Media Holdings LLC, San Jose, CA (US)

(72) Inventors: James Roseborough, Piedmont, CA (US); Stephen Coney, San Fransisco, CA (US)

(73) Assignee: Adeia Media Holdings LLC, San Jose, CA (US)

( * ) Notice: Subject to any disclaimer, the term of this patent is extended or adjusted under 35 U.S.C. 154(b) by 0 days.

(21) Appl. No.: 18/743,693

(22) Filed: Jun. 14, 2024

(65) Prior Publication Data

US 2024/0406287 A1    Dec. 5, 2024

Related U.S. Application Data

(63) Continuation of application No. 17/688,468, filed on Mar. 7, 2022, now Pat. No. 12,041,146, which is a
(Continued)

(51) Int. Cl.
*H04L 67/06* (2022.01)
*H04L 43/16* (2022.01)
(Continued)

(52) U.S. Cl.
CPC .............. *H04L 67/06* (2013.01); *H04L 43/16* (2013.01); *H04L 47/70* (2013.01); *H04L 67/01* (2022.05);
(Continued)

(58) Field of Classification Search
CPC ....... H04L 67/568; H04L 43/16; H04L 47/70; H04L 67/01; H04L 67/06; H04L 67/10; H04L 67/52; H04L 63/107
See application file for complete search history.

(56) References Cited

U.S. PATENT DOCUMENTS 8,874,750 B2    10/2014   Roseborough et al.
9,398,112 B2    7/2016    Roseborough et al.
(Continued)

OTHER PUBLICATIONS

G. Pallis, et al., "Insight and Perspectives for Content Delivery Networks," Communications of the ACM, vol. 49, No. 1, Jan. 2006, pp. 101-106.
(Continued)

*Primary Examiner* — Chi H Pham
*Assistant Examiner* — Raul Rivas
(74) *Attorney, Agent, or Firm* — Haley Guiliano LLP

(57) ABSTRACT

Mechanisms are provided to allow efficient delivery of content through a content delivery network (CDN) without taxing an origin server while maintaining fine grained location based access control. Requests to a CDN are augmented with quantized and non-quantized versions of location information. A CDN can use quantized location information in a URI to identify and return content if content corresponding to the URI is available in cache. If the content is not available in cache, the CDN can contact an origin server to obtain a result for the request using non-quantized location information. The origin server examines the non-quantized location information to determine whether to respond to the client request with content. The origin server examines the area corresponding to the quantized location information to determine whether the content should be cached at the CDN.

16 Claims, 6 Drawing Sheets

Related U.S. Application Data continuation of application No. 16/555,999, filed on Aug. 29, 2019, now Pat. No. 11,303,716, which is a continuation of application No. 15/188,951, filed on Jun. 21, 2016, now Pat. No. 10,447,801, which is a continuation of application No. 14/495,815, filed on Sep. 24, 2014, now Pat. No. 9,398,112, which is a continuation of application No. 13/074,989, filed on Mar. 29, 2011, now Pat. No. 8,874,750.

(51) Int. Cl.
*H04L 47/70* (2022.01)
*H04L 67/01* (2022.01)
*H04L 67/10* (2022.01)
*H04L 67/52* (2022.01)
*H04L 67/568* (2022.01)
*H04L 9/40* (2022.01)

(52) U.S. Cl.
CPC .............. *H04L 67/10* (2013.01); *H04L 67/52* (2022.05); *H04L 67/568* (2022.05); *H04L 63/107* (2013.01)

(56) References Cited

U.S. PATENT DOCUMENTS

| | | |
|---|---|---|
| 10,447,801 B2 | 10/2019 | Roseborough et al. |
| 11,303,716 B2 | 4/2022 | Roseborough et al. |
| 12,041,146 B2 | 7/2024 | Roseborough et al. |
| 2003/0217137 A1 | 11/2003 | Roese et al. |
| 2004/0023666 A1 | 2/2004 | Moon et al. |
| 2004/0147268 A1 | 7/2004 | Jensen et al. |
| 2005/0136895 A1 | 6/2005 | Thenthiruperai et al. |
| 2006/0069746 A1 | 3/2006 | Davis et al. |
| 2008/0171559 A1 | 7/2008 | Frank et al. |
| 2010/0250701 A1* | 9/2010 | Harvell ................ H04L 67/06 709/228 |
| 2010/0325194 A1 | 12/2010 | Williamson et al. |
| 2011/0208864 A1 | 8/2011 | St et al. |
| 2011/0237279 A1 | 9/2011 | Boudreau et al. |
| 2012/0089700 A1 | 4/2012 | Safruti et al. |
| 2012/0150645 A1 | 6/2012 | Mandyam et al. |
| 2012/0254432 A1 | 10/2012 | Roseborough et al. |
| 2012/0255036 A1 | 10/2012 | Kidder |
| 2012/0276931 A1 | 11/2012 | Nielsen et al. |
| 2015/0012589 A1 | 1/2015 | Roseborough et al. |
| 2016/0301767 A1 | 10/2016 | Roseborough et al. |
| 2019/0387070 A1 | 12/2019 | Roseborough et al. |
| 2022/0377155 A1 | 11/2022 | Roseborough et al. |

OTHER PUBLICATIONS

Kidder, Scott , "Proprietary Access Control Algorithms in Content Delivery Networks", U.S. Appl. No. 13/074,034, filed Mar. 29, 2011.

R. Fielding, et al., "Hypertext Transfer Protocol—HTTP/1.1" the Internet Society, Network Working Group, Request for comments 2616, copyright 1999, 114 pages.

G., Pallis , et al., "Insight and Perspectives for Content Delivery Networks", G. Pallis, et al., "Insight and Perspectives for Content Delivery Networks," Communications of the ACM, vol. 49, No. 1, Jan. 2006, pp. 101-106., 101-106.

R., Fielding , et al., "Hypertext Transfer Protocol—HTTP/1.1", R. Fielding, et al., "Hypertext Transfer Protocol—HTTP/1.1," the Internet Society, Network Working Group, Request for comments 2616, copyright 1999, 177 pages.

\* cited by examiner

| Location Restricted Resource Identifier 301 | Quantized Location Coordinates 303 | Non-Quantized Location Coordinates 305 |

Figure 3

LOCATION BASED ACCESS CONTROL FOR CONTENT DELIVERY NETWORK RESOURCES

CROSS-REFERENCE TO RELATED APPLICATION(S)

This application is a continuation of U.S. patent application Ser. No. 17/688,468, filed Mar. 7, 2022, which is a continuation of U.S. patent application Ser. No. 16/555,999, filed Aug. 29, 2019, now U.S. Pat. No. 11,303,716, which is a continuation of U.S. patent application Ser. No. 15/188,951, filed Jun. 21, 2016, now U.S. Pat. No. 10,447,801, which is a continuation of U.S. patent application Ser. No. 14/495,815, filed Sep. 24, 2014, now U.S. Pat. No. 9,398,112, which is a continuation of U.S. patent application Ser. No. 13/074,989, filed Mar. 29, 2011, now U.S. Pat. No. 8,874,750, the disclosures of which are incorporated by reference in their entireties.

TECHNICAL FIELD

The present disclosure relates to a mechanism for providing location based access control for content delivery network resources.

DESCRIPTION OF RELATED ART

It is often desirable to use content delivery networks (CDNs) to distribute resources such as media content to clients. CDNs have scalable network and server capacity to meet client demand. However, CDNs do not typically allow for fine grained access control to resources. Consequently, the techniques and mechanisms of the present invention provide improved mechanisms for providing location based access control.

Overview

Mechanisms are provided to allow efficient delivery of content through a content delivery network (CDN) without taxing an origin server while maintaining fine grained location based access control. Requests to a CDN are augmented with quantized and non-quantized versions of location information. A CDN can use quantized location information in a URI to identify and return content if content corresponding to the URI is available in cache. If the content is not available in cache, the CDN can contact an origin server to obtain a result for the request using non-quantized location information. The origin server examines the non-quantized location information to determine whether to respond to the client request with content. The origin server examines the area corresponding to the quantized location information to determine whether the content should be cached at the CDN.

These and other features of the present invention will be presented in more detail in the following specification of the invention and the accompanying figures, which illustrate by way of example the principles of the invention.

BRIEF DESCRIPTION OF THE DRAWINGS

The disclosure may best be understood by reference to the following description taken in conjunction with the accompanying drawings, which illustrate particular embodiments of the present invention.

FIG. 3 illustrates a particular example of a client request.

DESCRIPTION OF PARTICULAR EMBODIMENTS

Figure 1:
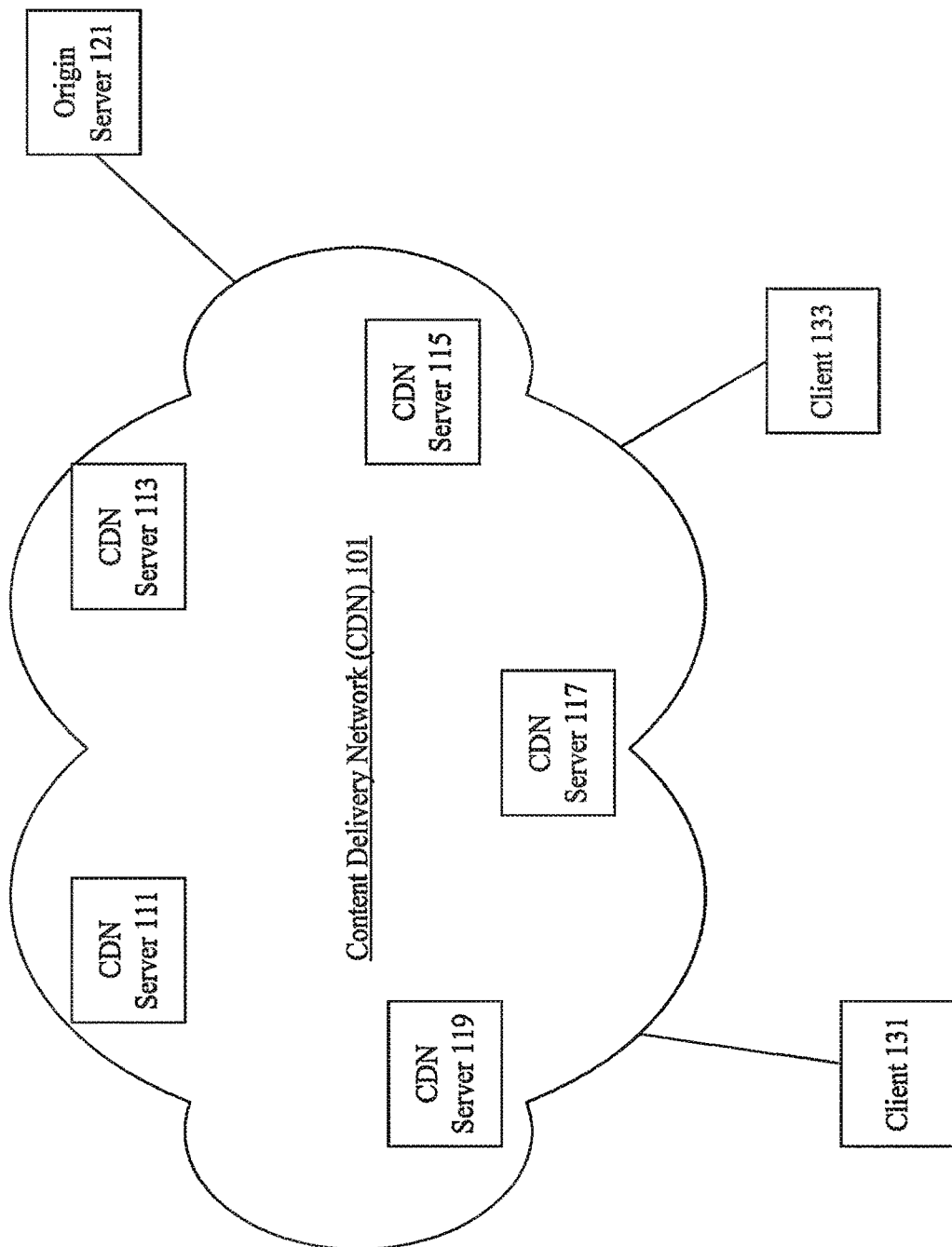
FIG. 1 illustrates a particular example of a network that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular devices such as mobile devices. However, it should be noted that the techniques and mechanisms of the present invention can be used with a variety of devices including general computing devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Many organizations rely on content delivery networks (CDNs) to efficiently deliver content to clients. CDNs generally have the network bandwidth and server capacity to scale up and down with client demand. It is often more economical for a content publisher to partner with a CDN to deliver content. Otherwise, the publisher may end up underinvesting or overinvesting in hardware and network capacity.

CDNs typically function by receiving requests from clients, checking a local cache for a copy of the requested resource, querying the origin server belonging to the publisher if the requested resource is missing from the cache or has expired, and then returning the resource to the client and storing it in cache for use with future requests. CDN servers are typically strategically located at the edges of various networks to limit loads on network interconnects and backbones. CDN servers are often redundantly deployed and interact with other CDN servers to respond to content requests from clients and optimize content delivery. Optimization may include bandwidth usage reduction, latency reduction, and improved availability.

However, a shortcoming of CDNs is that they typically do not allow for fine-grained access-control to network resources. Once the content is in cache, the function of access-control is left to the CDN. The access control systems employed by CDNs usually are meant to serve the greatest common denominator. This does not permit the fine-grained access-control that some organizations require.

Consequently, the techniques and mechanisms of the present invention allow location based or geographically allocated resources to be cached within a CDN while still permitting a fine-grained proprietary location based access-control algorithm to be applied by the origin server or content publisher. According to various embodiments, the CDN does not possess any knowledge or proprietary algorithm details, or that a proprietary algorithm even exists.

Some CDNs support location and geolocation checks common to all customers of the CDN. The CDN will typically prevent access to resources unless they pass certain geolocation checks. These checks are often based on source internet protocol (IP) address, which in a mobile environment is often unreliable. Other CDNs will rely entirely on an origin server for fine-grained access-control to resources. Requests received at a CDN server may be routed to an origin server for authorization. However, routing numerous requests to an origin server eliminates many of the benefits of using a CDN in the first place.

According to various embodiments, a system for providing fine grained location based access control includes an origin server, a CDN server, and a client. A client may be a mobile device, smartphone, computing system, etc. According to various embodiments, a client obtains location from using services such as global positioning system (GPS), cell tower triangulation, wireless fidelity (WiFi), radio frequency identification (RFID), near field communication (NFC), etc. In particular embodiments, GPS longitude and latitude coordinates are obtained using device based location application program interfaces (APIs). Using location information, the client sends a request for content that gets routed to a CDN. In particular embodiments, the request is based on a quantized version of the latitude and longitude as reported by the device based location APIs. For instance if the latitude and longitude is 37.75098874, 122.47389284, the quantized latitude and longitude to one significant decimal point would be 37.8,122.5.

According to various embodiments, the client request to the CDN would include the quantized latitude and longitude in a cacheable portion of the uniform resource locator (URL) or as query parameters of the URL. It is recognized that the degree of quantization may vary. Queries with particular quantized latitude and longitude values will correspond to particular resources cached at the CDN. In particular embodiments, the client request to the CDN would include the non-quantized latitude and longitude in a non-cacheable portion of the request such as headers or the query parameters of the URL. According to various embodiments, the CDN determines whether the content or resource is currently in cache. For example, the CDN would determine whether the content is currently in cache by using a query that includes quantized location information 37.8 and 122.5. If the resource such as media content is not cached, the CDN contacts the origin server to obtain the result of the request. The determination of whether a client is authorized to access location restricted content can be based on the more accurate non quantized latitude and longitude parameters at the origin server, while the determination is based on quantized latitude and longitude parameters at the CDN server. The origin server may create an audit record indicating the requested resource, the time of request and the returned result. The result returned will indicate whether the CDN should cache the content.

According to various embodiments, the origin server determines whether the CDN should cache the content based on whether the region defined by the quantized location information (e.g. 37.8 and 122.5) should have access to a particular piece of content. In some examples, the region defined by 37.8 and 122.5 should have access and the origin server instructs the CDN to cache the content to allow the CDN to efficiently respond to queries with the quantized location coordinates 37.8 and 122.5. In other examples, only part of the region defined by 37.8 and 122.5 should have access to the content. The 37.8 and 122.5 area may be the boundary region of a location based blackout zone. Consequently, the origin server directs the CDN not to cache the content. Requests from the 37.8 and 122.5 areas are forwarded to the origin server which handles responding to the requests using more fine grained non-quantized longitude and latitude values.

If the content or resource corresponding to a query with quantized location information is already cached, the content or resource is supplied from cache. The origin server may send a 302 re-direct with a quantized result with more accuracy or significant digits based on the non-quantized supplied latitude and longitude parameters. Such 302 re-direct responses are optional and could be repeated to obtain more fined grained cacheable results for boundary conditions of location based exclusion zones. According to various embodiments, content can be delivered quickly and efficiently through a CDN without taxing the origin server and without losing fine grained location based access control. This allows the CDN to excel in providing high capacity, high reliability, and low latency while allowing the publisher to maintain strict control over the access to location restricted content.

FIG. 1 illustrates one example of a CDN that can be used with various embodiments. According to various embodiments, a CDN 101 includes CDN servers 111, 113, 115, 117, and 119. In particular embodiments, CDN servers are strategically deployed to enhance content delivery performance. CDN servers may also be referred to surrogate servers or content replica servers. Effective CDN server placement may reduce the number of servers needed as well as the number of times content has to be replicated. A variety of algorithms can be used to deploy CDNs. Greedy algorithms continually make locally optimal choices with the hope of finding a global optimum. Hot spot algorithms place CDN servers near the clients generating the greatest load. Tree-based algorithms specify the locations of CDN servers to achieve particular levels of performance.

The number of CDN servers may vary from the dozens to thousands and distribute content from origin server 121. Although an origin server 121 may have very specific mechanisms for determining what clients have access to particular pieces of content, once the content is distributed onto a CDN 101, the origin server 121 has limited access control mechanisms. For example, client 131 may be authorized to access particular geographically restricted piece of content based on the location of the client 131 but a client 133 in a different geographic area may not. Alternatively, different versions of content may be provided to different geographic regions.

According to various embodiments, a client request for content is typically algorithmically directed at a CDN server that can efficiently server the client request. In order to verify that a particular client 131 has access to a piece of geographically restricted content, a request may be sent to an origin server 121 to perform location verification. However, location verification is typically based on internet protocol (IP) address, which is not a very accurate location indicator, particularly for mobile devices.

Figure 2:
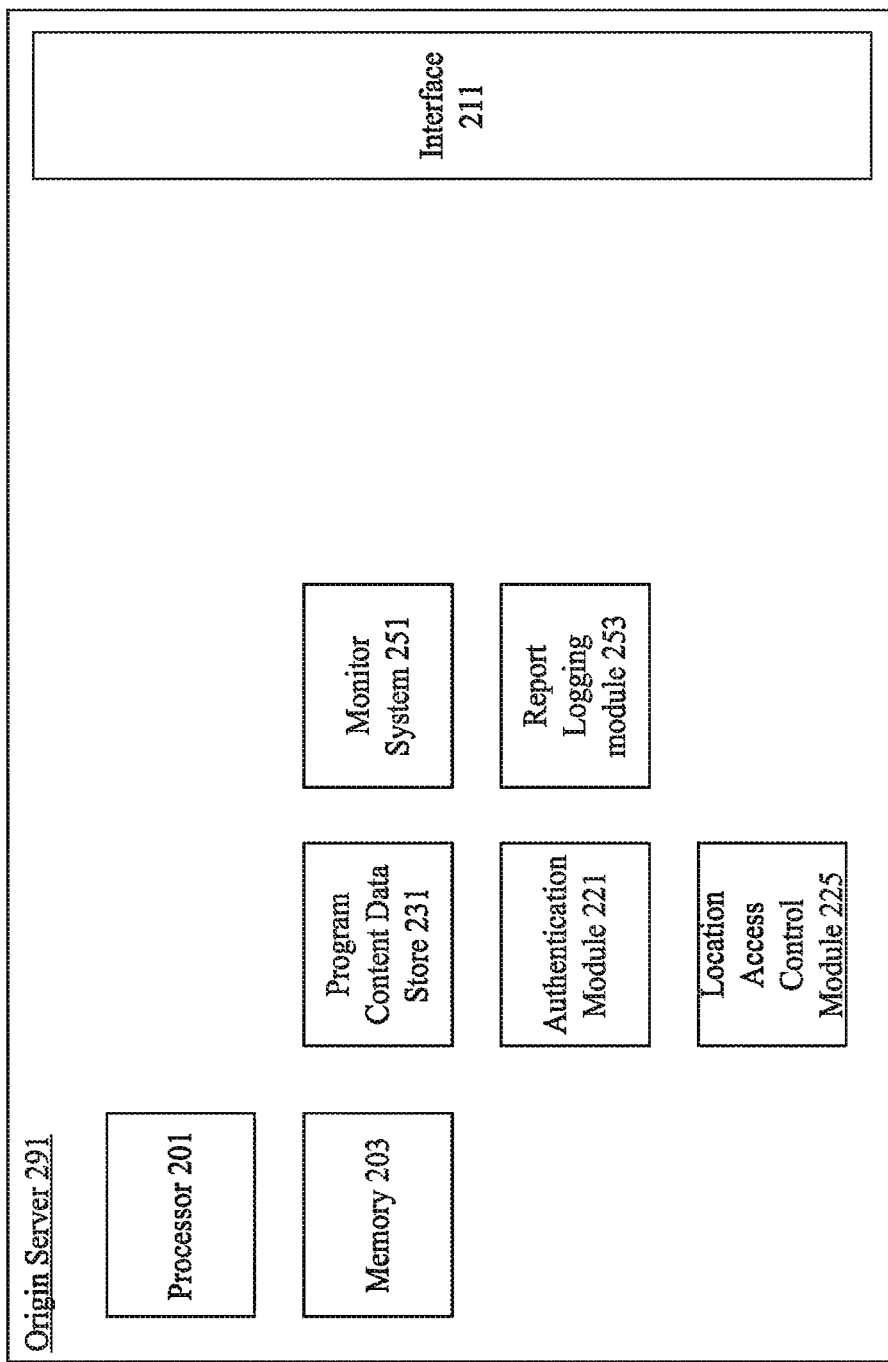
FIG. 2 illustrates a particular example of an origin server.

FIG. 2 is a diagrammatic representation showing one example of an origin server 291. According to various embodiments, the origin server 291 includes a processor 201, memory 203, and an interface. In some examples, the interfaces include a program content interfaces, buy engine interfaces, carrier interfaces, etc., to allow the origin server 291 the ability to interface with external entities including program content providers, carriers, vendors, billing systems, purchase engines, etc. The origin server 291 also can include a program content data store 231 configured to store program content such as video clips, pay per view content, movies, programs, and live or near-live streams. The origin server 291 can also maintain static information such as icons and menu pages.

An authentication module 221 verifies the identity of mobile devices. Location access control module 225 associated with authentication module 221 determines a client location to determine whether the client has access to a particular piece of content. For example, a location access control module may determine that a client while located in a geographic market X should not have access to a sports program. However, if the client moves to a location in a geographic market Y, the client should have access to the same sports program. Alternatively, the location access control module may determine that a client in a geographic market X should have access to a different news cast than a client in a geographic market Y even if the clients request the same piece of news programming.

In many implementations without CDNs, the origin server 291 can determine the location of the client using location information associated with the client. However, when CDNs distribute the content, CDNs typically do not allow for the same degree of access control and may provide a client with requested content regardless of geographic location. Alternatively, the CDN may forward client requests for content to an origin server 291 for the location access control module 225 to handle location restrictions. However, forwarding requests to the origin server 291 removes some of the primary benefits of using CDNs.

A logging and report generation module 253 tracks mobile device requests and associated responses. A monitor system 251 allows an administrator to view usage patterns and system availability. According to various embodiments, the origin server 291 handles requests and responses for media content related transactions and provides actual content. In particular embodiments, requests for content and actual content distribution can be handled by separate servers. In some embodiments, the origin server 291 can also be configured to provide media clips and files to a client in a manner that supplements a streaming server.

Although a particular origin server 291 is described, it should be recognized that a variety of alternative configurations are possible. For example, some modules such as a report and logging module 253 and a monitor 251 may not be needed on every server. Alternatively, the modules may be implemented on another device connected to the server. In another example, the server 291 may include a concrete buy engine implementation. A variety of configurations are possible.

FIG. 3 illustrates a particular example of a client request. According to various embodiments, a client request to a CDN includes a location restricted content identifier 301, quantized latitude and longitude information in a cacheable portion 303 of the uniform resource identifier (URI), as well as non-quantized latitude and longitude information in a non-cacheable portion 305. The cacheable portion may be the path of the URI or query parameters of a uniform resource locator (URL). The non-cacheable portion may be a header or other query parameters of the URL. According to various embodiments, the CDN may have content in cache to respond to a request including quantized longitude and latitude parameters. If the CDN has content to respond to the request, the content is provided to the client. If the CDN does not have content to respond to the request, the request is forwarded to an origin server to determine whether the client should have access to location restricted content.

Figure 4:
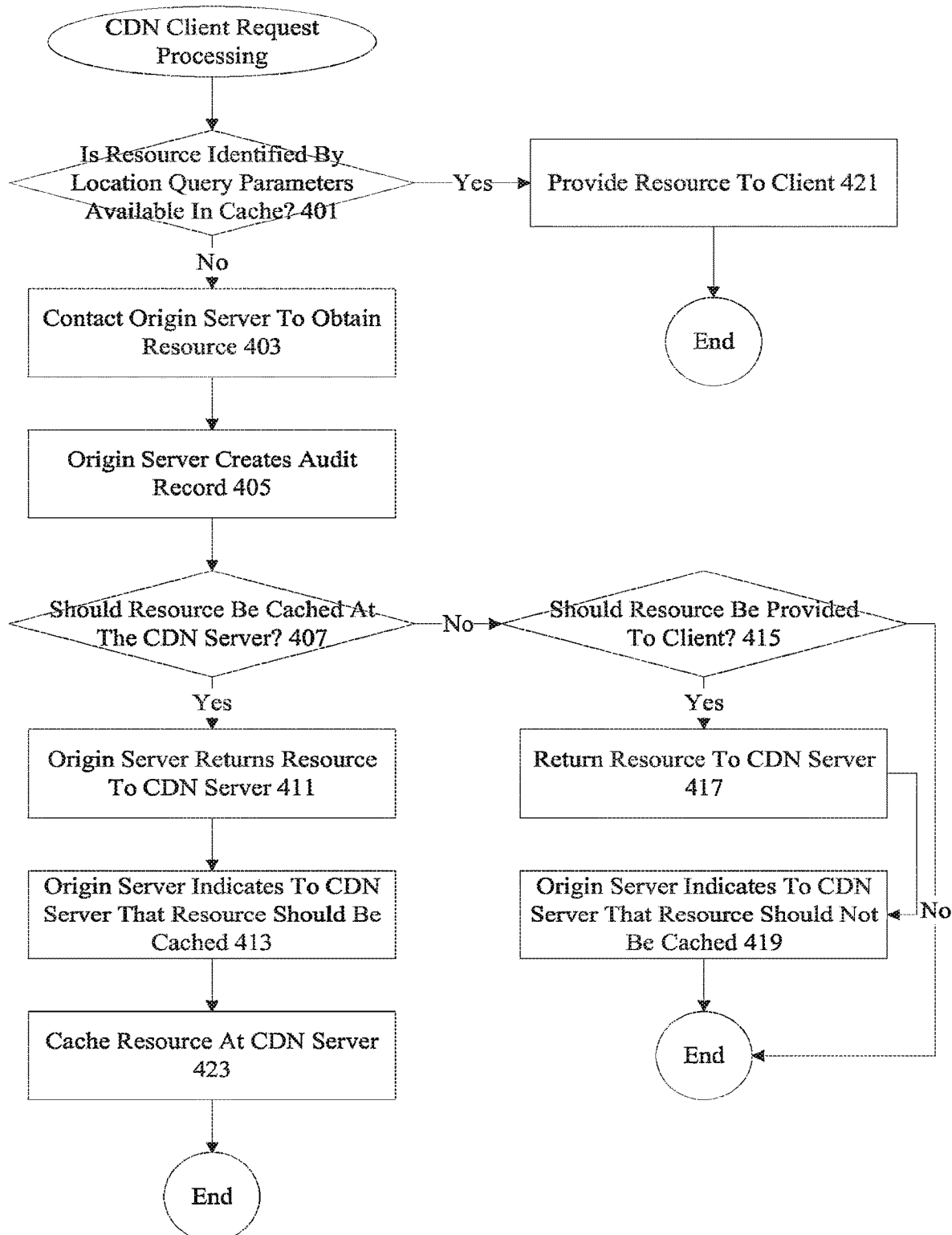
FIG. 4 illustrates a particular example of a content delivery network (CDN) processing a client request.

FIG. 4 illustrates a particular example of a CDN processing a client request. According to various embodiments, the CDN determines whether a resource is currently in cache at 401. If the resource is not currently in cache, the CDN contacts the origin server at 403 to obtain the result of the request. According to various embodiments, the determination is based on the more accurate non-quantized latitude and longitude parameters. At 405, the origin server creates an audit record identifying the requested resource, the time of the request, and the returned result. At 407, the origin server determines whether the content should be cached at a CDN. According to various embodiments, the origin server determines whether the geographic area defined by the quantized location value should have access to location restricted content. In particular embodiments, the area defined by 39.5 and 122.8 may fall entirely within a region that is allowed access to a particular sports program. The origin server returns the content to the CDN server at 411 and indicates to the CDN that the content should be cached 413. The resource is then cached at 415. The content can then subsequently be provided to any subscriber sending a request with the quantized location parameters 39.5 and 122.8.

In other embodiments, only part of the area defined by 39.5 and 122.8 should be allowed access to a particular piece of content 415. According to various embodiments, the area may cover a boundary line that separates a blackout zone from a non-blackout zone. Consequently, the origin server makes a determination of whether to send the content to the client based on more precise non-quantized location parameters, returns the resource to the CDN at 417, and indicates to the CDN that the content should not be cached at 419. If the resource is cached at 401, the result is supplied from cache at 421.

Figure 5:
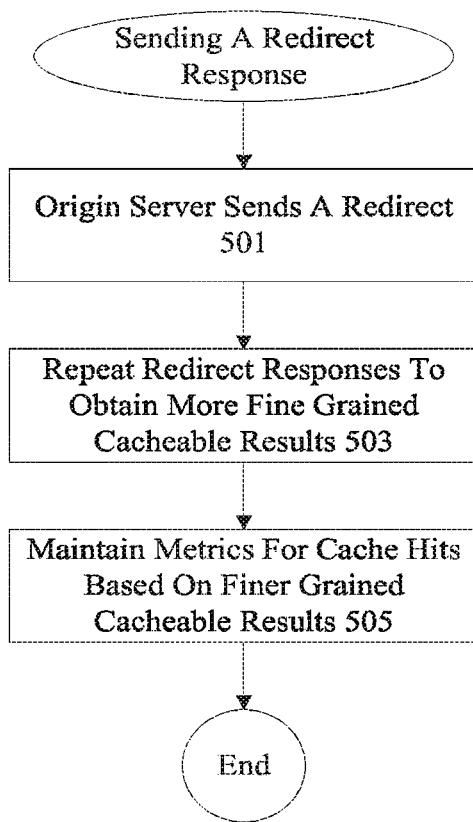
FIG. 5 illustrates a particular example of redirect request.

FIG. 5 illustrates one particular embodiment for sending redirect responses to provide for access control with finer granularity. According to various embodiments, an origin server sends a redirect such as a 302 re-direct at 501. The redirect has a quantized result with more accuracy or significant digits based on the non-quantized supplied latitude and longitude parameters. At 503, redirect responses are repeated to obtain more fine grained cacheable results for boundary conditions of location based exclusion zones.

Location based blackouts for location restricted media content can be implemented with precision. In particular embodiments, different content can be provided to different clients based on quantized location information. At 505, metrics are maintained for cache hits based on finer grained cacheable results. The level of granularity can be adjusted to provide for additional granularity if there are excessive requests forwarded to an origin server.

Figure 6:
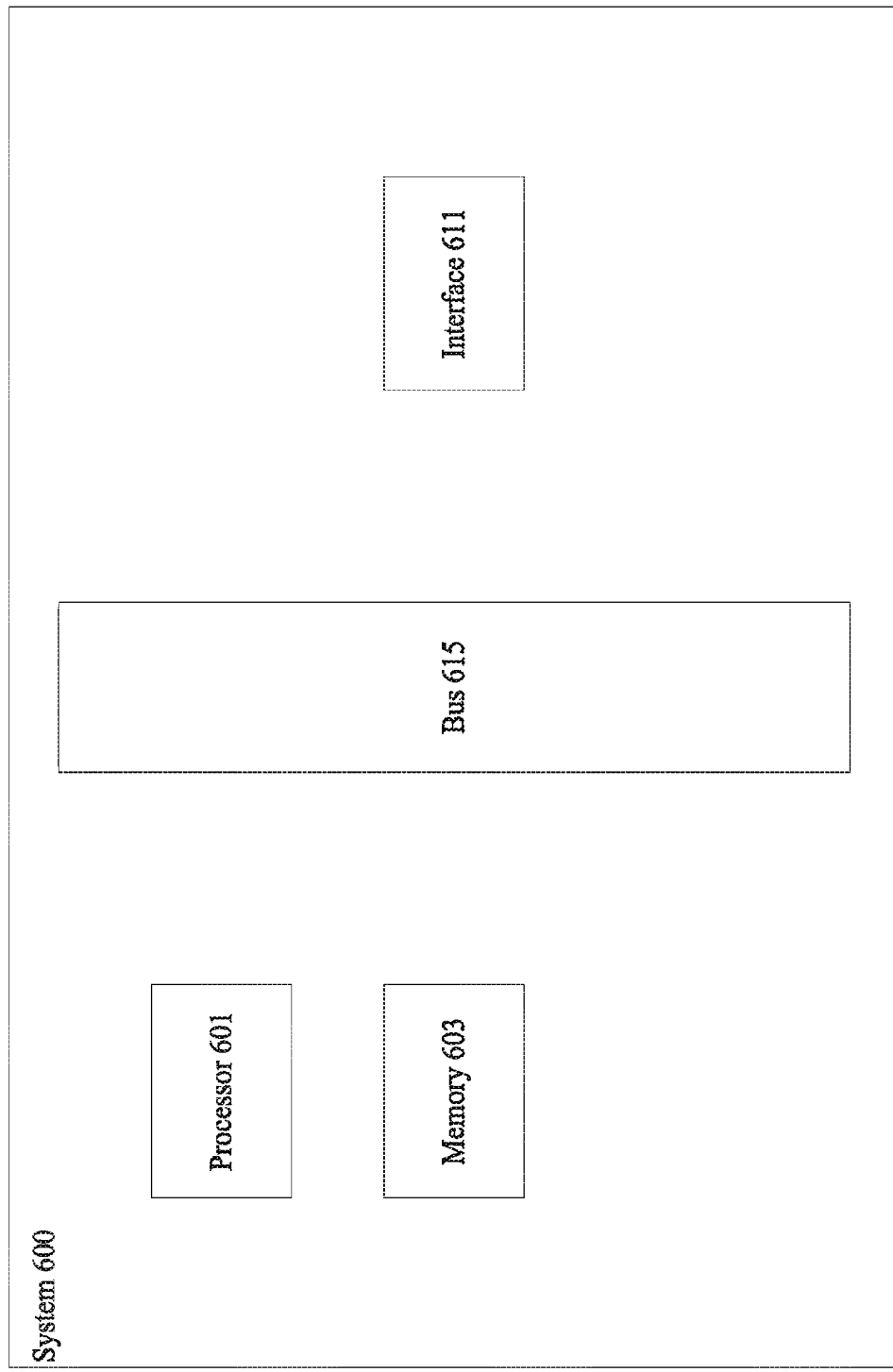
FIG. 6 illustrates a particular example of a client device.

FIG. 6 illustrates one example of a server that can be used to provide location based access control. According to particular embodiments, a system 600 suitable for implementing particular embodiments of the present invention includes a processor 601, a memory 603, an interface 611, and a bus 615 (e.g., a PCI bus or other interconnection fabric) and operates as a streaming server. When acting under the control of appropriate software or firmware, the processor 601 is responsible for modifying and transmitting live media data to a client. Various specially configured devices can also be used in place of a processor 601 or in addition to processor 601. The interface 611 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 600 is a content server that also includes a transceiver, streaming buffers, and a program content database. The content server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server 691 handles requests and responses for media content related transactions while a separate streaming server provides the actual media streams.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
receiving a service request from a client device, wherein the service request comprises first location coordinates;
identifying a first geographical region based on the first location coordinates;
determining whether devices located in entirety of the first geographical region are allowed access to the requested service;
based at least in part on determining that: (a) devices in a first part of the first geographical region are allowed to access the requested service, and (b) devices in a second part of the first geographical region are not allowed to access the requested service:
sending a request for more precise location coordinates from the client device; and
receiving second location coordinates that are more precise than the first location coordinates based on the request;
identifying a second geographical region based on the second location coordinates, wherein the second geographical region is within an area wherein devices are allowed access to the requested service; and
based at least in part on determining that the second geographical region is within the first part of the first geographical region, providing a service requested by the service request to the client device.

2. The method of claim 1, wherein the first location coordinates comprise first latitude coordinates and first longitude coordinates and the second location coordinates comprise second latitude coordinates and second longitude coordinates.

3. The method of claim 1, wherein the second location coordinates comprise more significant digits than the first location coordinates.

4. The method of claim 1, comprising:
obtaining at least one of the first location coordinates or the second location coordinates from at least one of an origin server, a content delivery network (CDN) server, a client server, a global positioning system (GPS) device, a cell tower triangulation, a wireless fidelity (WiFi) device, a radio frequency identification (RFID) device, a near field communication (NFC) device, or a device based location application program interface (API).

5. The method of claim 1, comprising:
storing in a cache at least one of a cacheable portion of a uniform resource identifier (URI), wherein the URI comprises at least the first location coordinates, or a query parameter of a uniform resource locator (URL), wherein the URL comprises at least the first location coordinates.

6. The method of claim 5, comprising:
supplying the requested service from the cache, in response to determining that the requested service corresponds to at least one of cacheable portion of a URI or query parameter of a URL stored in the cache.

7. The method of claim 1, wherein:
the providing the service requested by the service request to the client device is further based at least in part on verifying subscription information of the client device.

8. The method of claim 1, comprising:
creating an audit record identifying the service request, a service request time, and the requested service.

9. A system comprising control comprising:
an input/output circuitry configured to:
receive a service request from a client device, wherein the service request comprises first location coordinates; and
a control circuitry configured to:
identify a first geographical region based on the first location coordinates;
determine whether devices located in entirety of the first geographical region are allowed access to the requested service;
wherein the input/output circuitry is further configured to:
based at least in part on determining that: (a) devices in a first part of the first geographical region are allowed to access the requested service, and (b) devices in a second part of the first geographical region are not allowed to access the requested service:
send a request for more precise location coordinates from the client device; and
receive second location coordinates that are more precise than the first location coordinates based on the request;
wherein the control circuitry is further configured to:
identify a second geographical region based on the second location coordinates, wherein the second geographical region is within an area wherein devices are allowed access to the requested service; and
based at least in part on determining that the second geographical region is within the first part of the first geographical region, provide a service requested by the service request to the client device.

10. The system of claim 9, wherein the first location coordinates comprise first latitude coordinates and first longitude coordinates and the second location coordinates comprise second latitude coordinates and second longitude coordinates.

11. The system of claim 9, wherein the second location coordinates comprise more significant digits than the first location coordinates.

12. The system of claim 9, wherein the control circuitry is configured to:
obtain at least one of the first location coordinates or the second location coordinates from at least one of an origin server, a content delivery network (CDN) server, a client server, a global positioning system (GPS) device, a cell tower triangulation, a wireless fidelity (WiFi) device, a radio frequency identification (RFID) device, a near field communication (NFC) device, or a device based location application program interface (API).

13. The system of claim 9, wherein the control circuitry is configured to:
store in a cache at least one of a cacheable portion of a uniform resource identifier (URI), wherein the URI comprises at least the first location coordinates, or a query parameter of a uniform resource locator (URL), wherein the URL comprises at least the first location coordinates.

14. The system of claim 13, wherein the control circuitry is configured to:
supply the requested service from the cache, in response to determining that the requested service corresponds to at least one of cacheable portion of a URI or query parameter of a URL stored in the cache.

15. The system of claim 9, wherein the control circuitry is configured to:
provide the service requested by the service request to the client device, wherein the providing the service requested by the service request to the client device is further based at least in part on verifying subscription information of the client device.

16. The system of claim 9, wherein the control circuitry is configured to:
create an audit record identifying the service request, a service request time, and the requested service.

* * * * *